(12) United States Patent
Lu et al.

(10) Patent No.: US 8,565,554 B2
(45) Date of Patent: Oct. 22, 2013

(54) RESIZING OF DIGITAL IMAGES

(75) Inventors: Yan Lu, Beijing (CN); Wen Sun, Anhui (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 12/684,925

(22) Filed: Jan. 9, 2010

(65) Prior Publication Data
US 2011/0170801 A1      Jul. 14, 2011

(51) Int. Cl.
*G06K 9/32*      (2006.01)

(52) U.S. Cl.
USPC ........... 382/298; 345/593; 345/668; 345/441; 358/1.9

(58) Field of Classification Search
None
See application file for complete search history.

(56) References Cited

U.S. PATENT DOCUMENTS

| | | | |
|---|---|---|---|
| 5,384,904 A * | 1/1995 | Sprague et al. | 345/668 |
| 6,501,509 B1 * | 12/2002 | Han | 348/441 |
| 6,825,857 B2 | 11/2004 | Harasimiuk | |
| 6,928,186 B2 * | 8/2005 | Ratnakar | 382/166 |
| 7,184,041 B2 | 2/2007 | Heng | |
| 7,199,837 B2 * | 4/2007 | Callway et al. | 348/581 |
| 7,477,323 B2 | 1/2009 | Chou | |
| 7,548,233 B1 | 6/2009 | Lee | |
| 2001/0020949 A1 * | 9/2001 | Gong et al. | 345/593 |
| 2004/0202349 A1 * | 10/2004 | Erol et al. | 382/100 |
| 2007/0092162 A1 | 4/2007 | Keithley | |
| 2007/0206207 A1 * | 9/2007 | Watanabe | 358/1.9 |
| 2008/0084927 A1 | 4/2008 | Rosenzweig | |
| 2008/0123940 A1 * | 5/2008 | Kundu et al. | 382/159 |

OTHER PUBLICATIONS

Adobe Systems Inc., GPU Acceleration support in Acrobat and Adobe Reader (8.x), http://kb2.adobe.com/cps/333/333447.html, Jul. 31, 2009.
Corduneanu, A., J. C. Platt, Learning spatially-variable filters for super-resolution of text, Proc. of the 2005 Int'l Conf. on Image Processing, Sep. 2005, pp. 849-852, Genoa, Italy.
Freeman, W. T., T. R. Jones, E. C. Pasztor, Example-based super-resolution, IEEE Comp. Graphics and Applications, Mar./Apr. 2002, vol. 22, No. 2, pp. 56-65.
Haffner, P., L. Bottou, P. G. Howard, Y. LeCun, DjVu: Analyzing and compressing scanned documents for internet distribution, Fifth Int'l Conf. on Document Analysis and Recognition, Sep. 1999, pp. 625-628, Bangalore, India.
Li, X., M. T. Orchard, New edge directed interpolation, Proc. of the 2000 Int'l Conf. on Image Processing, Sep. 2000, Vancouver, BC, Canada.
Lin, T., P. Hao, Compound image compression for real-time computer screen image transmission, IEEE Transactions on Image Processing, Aug. 2005, vol. 14, No. 8, pp. 993-1005.

(Continued)

*Primary Examiner* — Tsung-Yin Tsai
(74) *Attorney, Agent, or Firm* — Lyon & Harr, LLP; Richard T. Lyon (57) ABSTRACT

Digital images are resized according to a prescribed image scaling factor. An original image is re-sampled according to the scaling factor, resulting in an initial resized image. A probability of text (POT) map is generated for the initial resized image, where the POT map specifies a smoothed POT value for each pixel in the initial resized image. A weighting factor (WF) map is generated which maps each different smoothed POT value to a particular WF value. The WF map is used to calculate an adjusted luminance value for each pixel in the initial resized image, resulting in a final resized image.

12 Claims, 7 Drawing Sheets

(56) References Cited

OTHER PUBLICATIONS

Muñoz, A., T. Blu, M. Unser, Least-squares image resizing using finite differences, IEEE Transactions on Image Processing, vol. 10, No. 9, pp. 1365-1378.

Said, A., Compression of compound images and video for enabling rich media in embedded systems imaging systems laboratory, HP Laboratories Palo Alto, HPL-2004-89, May 2004.

Scheuermann, T., J. Hensley, Efficient histogram generation using scattering on GPUs, Proc. of the 2007 Symposium on Interactive 3D Graphics, Apr. 30-May 2, 2007, pp. 33-37, Seattle, Washington, USA.

Wikipedia, Bilinear interpolation, retrieved Jul. 31, 2009 from http://en.wikipedia.org/wiki/Bilinear_interpolation.

Wikipedia, Image scaling, retrieved Jul. 31, 2009 from http://en.wikipedia.org/wiki/Image_scaling.

* cited by examiner

RESIZING OF DIGITAL IMAGES

BACKGROUND

Image resizing is generally used to change the pixel resolution of an original digital image in order to adapt it to the resolution of a particular image output device such as a display device, printer and the like, or to adapt it to the resolution of a prescribed region of an output device into which the image is being fitted. An example of the latter is the generation of a "thumbnail" which is frequently used to preview an original digital image. As such, image resizing is a routinely employed procedure in the arts of computer graphics and digital image processing. For example, image resizing is frequently employed in applications such as digital photography, electronic publishing and medical imaging. Image resizing is also frequently employed in a variety of different personal computing applications such as remote desktop, screen sharing over a communications network, and displaying downloaded Internet data.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Image resizing technique embodiments described herein generally involve resizing digital images. In an exemplary embodiment an original image is re-sampled according to a prescribed image scaling factor, resulting in an initial resized image. A probability of text (POT) map is generated for the initial resized image, where the POT map specifies a smoothed POT value for each pixel in the initial resized image. A weighting factor (WF) map is generated which maps each different smoothed POT value to a particular WF value. The WF map is used to calculate an adjusted luminance value for each pixel in the initial resized image, resulting in a final resized image.

DESCRIPTION OF THE DRAWINGS

The specific features, aspects, and advantages of the image resizing technique embodiments described herein will become better understood with regard to the following description, appended claims, and accompanying drawings where:

DETAILED DESCRIPTION

In the following description of image resizing technique embodiments reference is made to the accompanying drawings which form a part hereof, and in which are shown, by way of illustration, specific embodiments in which the technique can be practiced. It is understood that other embodiments can be utilized and structural changes can be made without departing from the scope of the technique embodiments.

The term "image" is used herein to refer to a digital image which is composed of an array of pixels having a particular pixel resolution. The term "image resizing" is used herein to refer to the enlargement (i.e., magnification) or reduction (i.e., miniaturization) of the size of an image using a prescribed image scaling factor. In other words, image resizing is employed to convert an image from an original pixel grid having a first number of pixels (i.e., a first pixel resolution) to a resized pixel grid having a second number of pixels (i.e., a second pixel resolution), where the first number of pixels can be either greater than or less than the second number of pixels. The term "text/graphics" is used herein to refer to the existence of either text content, or graphics content, or both text and graphics content in an image. Exemplary graphics content includes, but is not limited to, icons, image borders/frames, and the like. The term "natural image" is used herein to refer to an image from the natural environment such as a photograph of a natural object or scene, and the like, or a thumbnail representation thereof. The term "compound image" is used herein to refer to a hybrid image that includes both regions having text/graphics content and regions having natural image content.

1.0 Resizing of Digital Images

Based on the ubiquity of digital computing and communications in the world today, on any given day a typical person uses one or more computing and communications devices such as a personal computer (PC), laptop device, cell phone, personal digital assistant (PDA), and the like. In conjunction with their use of these devices the person will typically encounter various images such as those present in web pages, presentation slides, other types of documents, video game scenes, and the like; these various images will frequently be compound images. Resizing of these images may be necessary for a variety of reasons including, but not limited to, those described heretofore. Additionally, in the aforementioned remote desktop application users generally prefer a full-screen view of the remote desktop. Therefore, an original image being displayed on the remote desktop has to be resized when the display resolution of the local desktop is different than the display resolution of the remote desktop. Selecting the most appropriate method for resizing an image often involves a tradeoff between computing overhead, efficiency, the smoothness of the resized image, and the sharpness of the resized image.

Generally speaking, the image resizing technique embodiments described herein involve the resizing of digital images. While these technique embodiments are well suited to resizing compound images, it is noted that these technique embodiments can also be used to resize non-compound images such as an image having only text/graphics content or an image having only natural image content. As will be appreciated from the more detailed description which follows, the image resizing technique embodiments described herein process each original image being resized in a content-adaptive manner which takes into account the particular content of the image. More particularly, the image resizing technique embodiments segment the image into different blocks, analyze the content of each block, and individually process each block according to its particular content.

The image resizing technique embodiments described herein are advantageous for a variety of reasons including, but not limited to, the following. Generally speaking, the image resizing technique embodiments do not perceptively degrade the visual quality of the original image when it is resized so that the perceived clarity and sharpness of the original image are generally maintained in the resized image, both in any text/graphics regions and any natural image regions that may exist in the original image.

Additionally and as will also be appreciated from the more detailed description which follows, the image resizing technique embodiments described herein involve block-by-block and pixel-by-pixel calculations which are identical and are made up of simple arithmetic and neighbor-fetching operations. Thus, the image resizing technique embodiments consume only a moderate amount of processing bandwidth and can be implemented in a highly parallel (i.e., concurrent) manner. As such, portions of the image resizing technique embodiments are well suited to being implemented on the parallel processing (also known as single-instruction multiple-threads (SIMT)) architecture of commercially available graphics processing unit (GPU) hardware. Therefore, the speed at which an image can be resized can be optimized to a level where the image resizing technique embodiments can be used in time-sensitive, compound image related applications such as remote desktop and screen sharing over a communications network. Furthermore, the image resizing technique embodiments will scale well with future generations of GPU hardware whose architectures are expected to have increasing amounts of parallelism.

1.1 Framework

Figure 1:
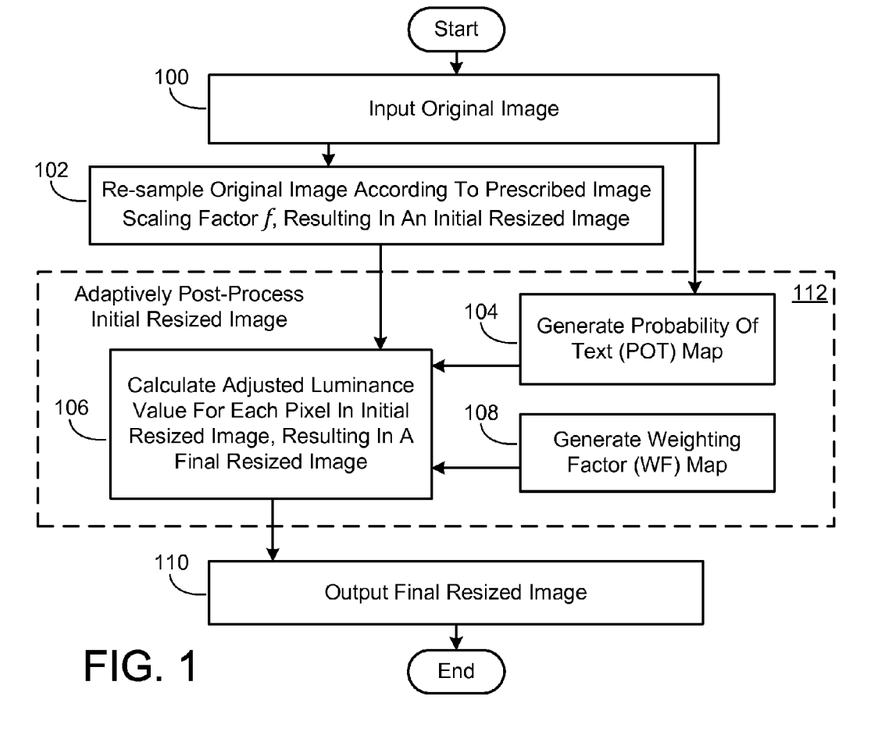
FIG. 1 is a flow diagram illustrating an exemplary embodiment, in simplified form, of a process framework for resizing a digital image.

FIG. 1 illustrates an exemplary embodiment, in simplified form, of a process framework for resizing a digital image. As exemplified in FIG. 1, the process starts in element 100 by inputting an original image which is to be resized according to a prescribed image scaling factor f. The original image is then re-sampled according to the scaling factor f, resulting in an initial resized image (element 102). In one embodiment of the image resizing technique described herein a conventional bilinear interpolation method is employed to re-sample the original image. The use of this bilinear interpolation method is advantageous since it is ubiquitously native supported by commercially available GPU hardware, which serves to substantially increase the speed at which the re-sampling procedure can be performed. It is noted however that alternate embodiments of the image resizing technique are also possible where any other interpolation method can be employed to re-sample the original image, and where GPU hardware is not employed.

As is appreciated in the arts of computer graphics and digital image processing, the re-sampling of an original image can result in a resized image in which artifacts are introduced into regions of the resized image where the original image has a clear boundary between adjacent pixels such as certain object edges, text/graphics edges and other fine-grain details in the original image. Examples of such artifacts include, but are not limited to, blurring and aliasing. In other words, the re-sampling of an original image can degrade the original image by softening details in the resulting resized image and by generating "jagginess" on certain object edges and text/graphics edges in the resized image. The image resizing technique embodiments described herein address this situation in the following manner.

Referring again to FIG. 1, the initial resized image is adaptively post-processed (element 112) in order to alleviate any artifacts that may have been introduced into the initial resized image by the re-sampling. As will be appreciated from the more detailed description which follows, this adaptive post-processing is based on the statistics of neighboring pixels which are calculated by analyzing the content of the original image. More particularly, the original image is first processed to generate a probability of text (POT) map for the initial resized image, where the POT map specifies a smoothed POT value for each pixel in the initial resized image, where the POT value for a given pixel estimates the probability of that pixel being either a text pixel or a graphics pixel (element 104). In other words, the POT map generally provides an estimation of the content of the initial resized image. A weighting factor (WF) map is generated which maps each different smoothed POT value to a particular WF value (element 108). The WF map is then used to calculate an adjusted luminance value for each pixel in the initial resized image, resulting in a final resized image (element 106). The final resized image can then be output (element 110) for subsequent rendering, storage, additional processing, transmission over a network, or other like operations.

Referring again to FIG. 1, a more detailed description of the aforementioned procedures for generating the POT map (element 104), generating the WF map (element 108), and calculating an adjusted luminance value for each pixel in the initial resized image (element 106) will now be provided.

1.2 Luminance Value Adjustment

This section provides a more detailed description of an exemplary embodiment of the aforementioned procedure for using the WF map to calculate an adjusted luminance value for each pixel in the initial resized image, resulting in the final resized image. It is noted that only the luminance value for each pixel in the initial resized image is adjusted. The chrominance value for each pixel in the initial resized image remains unchanged.

Given that $y_{IR}^i$ denotes the luminance value for the i-th pixel in the initial resized image and $y_{FR}^i$ denotes the adjusted luminance value for the i-th pixel in the final resized image, $y_{FR}^i$ can be given by the following equation:

$$y_{FR}^i = y_{IR}^i + w(pt^i) \times \Delta y_{IR}^i, \qquad (1)$$

where $pt^i$ denotes the smoothed POT value for the i-th pixel in the initial resized image, $w(pt^i)$ denotes the WF value for $pt^i$, and $\Delta$ denotes a conventional Laplace operator. It is noted that $pt^i$ is taken from the aforementioned POT map and $w(pt^i)$ is taken from the aforementioned WF map. In one embodiment of the image resizing technique described herein the following 3×3 kernel can be employed for $\Delta y_{IR}^i$:

$$\begin{pmatrix} -1 & -1 & -1 \\ -1 & 8 & -1 \\ -1 & -1 & -1 \end{pmatrix}. \qquad (2)$$

It is noted however that alternate embodiments of the image resizing technique are also possible which employ other values for the elements in the kernel and other kernel sizes.

It will thus be appreciated that equation (1) generally serves to adaptively adjust the luminance gradient of the initial resized image based on the POT map's estimation of the contents of the original image. More particularly, equation (1) serves to sharpen the aforementioned regions of the initial resized image where artifacts were introduced during the re-sampling of the original image and thus alleviates these artifacts while avoiding "over-sharpening" of these regions. By way of example, but not limitation, object edges, text/graphics edges and fine-grain details which are blurred or aliased in the initial resized image will be restored in the final resized image (i.e., the blurring or aliasing will be alleviated). Additionally, equation (1) also serves to "smooth" the pixels in the natural image regions of the initial resized image, thus alleviating the magnification of any noise, distortion or other artifacts which may be present in the natural image regions of the original image.

1.3 Probability of Text (POT) Map Generation

Figure 2A:
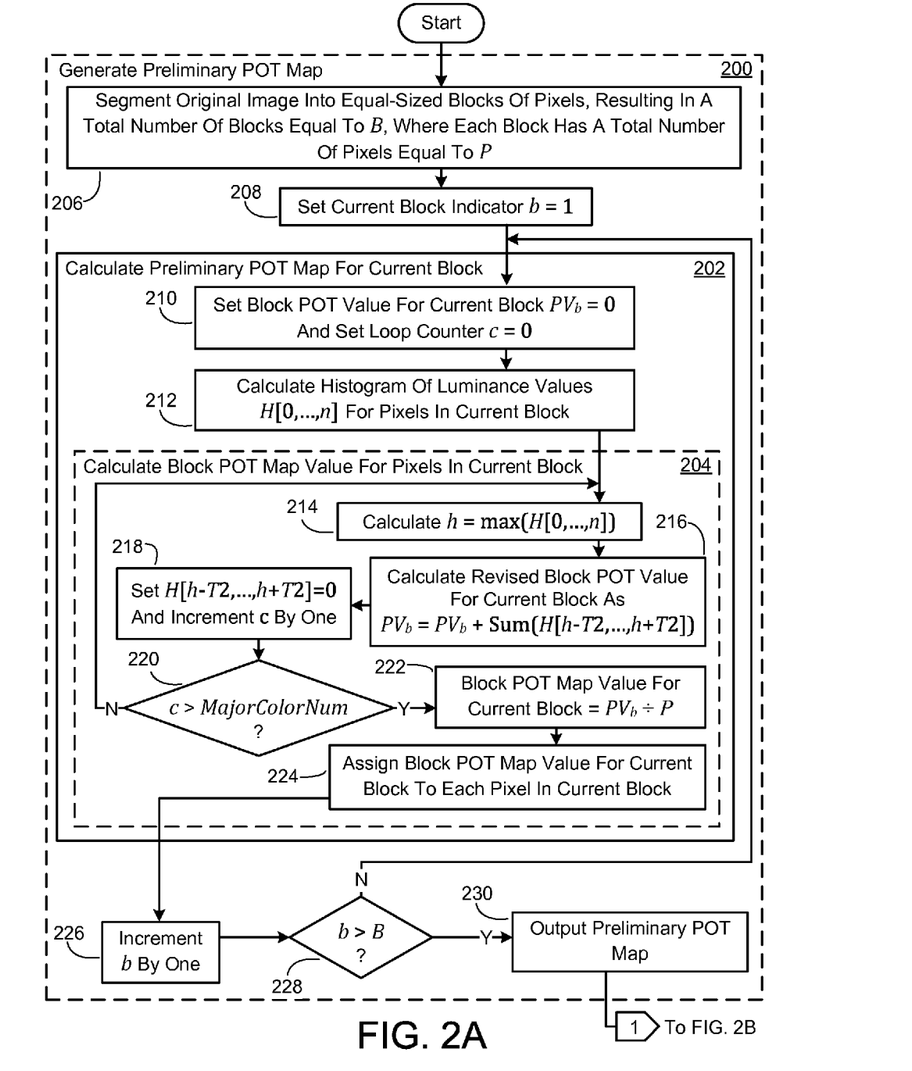
FIGS. 2A and 2B are a flow diagram illustrating an exemplary embodiment, in simplified form, of a process for generating a probability of text (POT) map for the image which specifies a smoothed POT value for each pixel in the image.
Figure 2B:
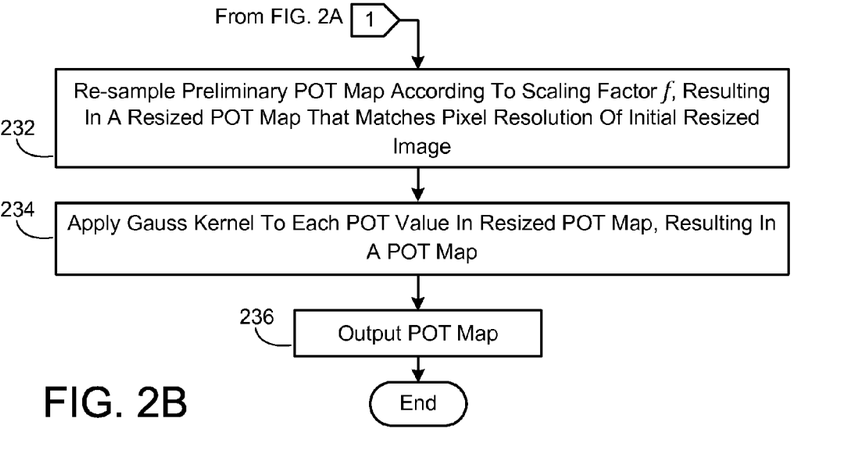

FIGS. 2A and 2B illustrate an exemplary embodiment, in simplified form, of a process for generating the POT map for the initial resized image which specifies a smoothed POT value for each pixel in the initial resized image, where the POT value for a given pixel estimates the probability of that pixel being either a text pixel or a graphics pixel. As exemplified in FIG. 2A, the process starts in element 200 by generating a preliminary POT map for the original image. More particularly, the original image is first segmented into equal-sized blocks of pixels where each block has a size of z pixels×z pixels and a total number of pixels equal to P (i.e., P=z×z) (element 206). This image segmentation procedure results in a total number of blocks equal to B. In one embodiment of the image resizing technique described herein the blocks can have a size of 8 pixels×8 pixels such that P=64. It is noted however that alternate embodiments of the image resizing technique are also possible where other block sizes can be employed. Once the original image segmentation procedure (element 206) has been completed, the value of a current block indicator b is then initialized to one (element 208).

Referring again to FIG. 2A, a preliminary POT map is then calculated for each block of pixels b (element 202). More particularly, given that $PV_b$ denotes a block POT value for the current block of pixels, the value of $PV_b$ is first initialized to zero and the value of a loop counter c is also initialized to zero (element 210). A histogram of the luminance values for the pixels in the current block H[0, . . . , n] is then calculated (element 212), where the histogram has a different bin for each different luminance value that a pixel can have, and (n+1) denotes the number of bins in the histogram. In one embodiment of the image resizing technique described herein where the pixels in the original image have a depth of eight bits, n=255 so that bin zero has a count of the number of pixels in the current block which have a luminance value equal to zero, bin one has a count of the number of pixels in the current block which have a luminance value equal to one, and so on up to bin 255 which has a count of the number of pixels in the current block which have a luminance value equal to 255. It is noted however that alternate embodiments of the image resizing technique are also possible where other values for n can be employed. By way of example but not limitation, in another embodiment of the image resizing technique where the pixels in the original image have a depth of six bits, n=63.

Referring again to FIG. 2A, a block POT map value for each of the pixels in the current block is then calculated as follows (element 204). The luminance histogram H[0, . . . , n] is first analyzed to identify the current bin h of the histogram that has the largest count (i.e., h=max (H[0, . . . , n])) (element 214). A revised block POT value for the current block of pixels is then calculated by adding the current block POT value for the current block $PV_b$ to the sum of the luminance values associated with the set of bins [h−T2, . . . , h+T2] in the histogram, where T2 denotes a prescribed luminance clustering threshold (i.e., $PV_b=PV_b+Sum(H[h-T2, . . . , h+T2])$) (element 216). In one embodiment of the image resizing technique described herein T2 is set equal to five. It is noted however that alternate embodiments of the image resizing technique are also possible where T2 can have other values. The set of bins [h−T2, . . . , h+T2] in the histogram is then set equal to zero (i.e., H[h−T2, . . . , h+T2]=0) and the loop counter c is incremented by one (element 218). In the case where c is not greater than a prescribed major color number constant MajorColorNum (element 220), process elements 214, 216 and 218 are repeated. In one embodiment of the image resizing technique described herein MajorColorNum is set equal to four. It is noted however that alternate embodiments of the image resizing technique are also possible where MajorColorNum can have other values.

Referring again to FIG. 2A, the repetition of process elements 214, 216 and 218 continues until c is greater than MajorColorNum (element 220), in which case the block POT map value for the current block of pixels is then set equal to the last revised block POT value for the current block $PV_b$ divided by the total number of pixels P in the block (element 222). The preliminary POT map for the current block is then constructed by assigning the block POT map value for the current block to each pixel in the current block (element 224). The current block indicator b is then incremented by one (element 226). In the case where b is not greater than the total number of blocks B (element 228), process element 202 is then repeated in order to calculate a preliminary POT map for the next block of pixels in the original image. Once a preliminary POT map has been calculated for all of the blocks of pixels in the original image (i.e., once b is greater than B) (element 228), the generation of the preliminary POT map for the original image has been completed (element 230). This preliminary POT map specifies a POT value for each pixel in the original image, where the POT value for a given pixel estimates the probability of the pixel being either a text pixel or a graphics pixel. It will be appreciated that blocks of pixels having text/graphics content and object edges will be assigned a high probability in the preliminary POT map. Blocks of pixels that do not have text/graphics content and object edges, such as blocks that are located in the background of the image, will be assigned a low probability in the preliminary POT map.

As exemplified in FIG. 2B, the preliminary POT map is then re-sampled according to the aforementioned prescribed image scaling factor f, resulting in a resized POT map that matches the pixel resolution of the aforementioned initial resized image (element 232). It is noted that this re-sampling can be performed using the same method that is employed to re-sample the original image, which results in the initial resized image as described heretofore. It is further noted that the resized POT map specifies a POT value for each pixel in the initial resized image. A separable Gauss kernel is then applied to each POT value in the resized POT map, resulting in a POT map which specifies a smoothed POT value for each pixel in the initial resized image (element 234). In other words, the application of the Gauss kernel makes the POT values in the POT map continuous and smooth, which enhances the quality of the final resized image by eliminating large POT value changes between adjacent pixels. In one embodiment of the image resizing technique described herein the Gauss kernel has a size of 5×5. It is noted however that alternate embodiments of the image resizing technique are also possible where other sizes can be employed for the Gauss kernel.

1.4 Weighting Factor (WF) Map Generation

Figure 3:
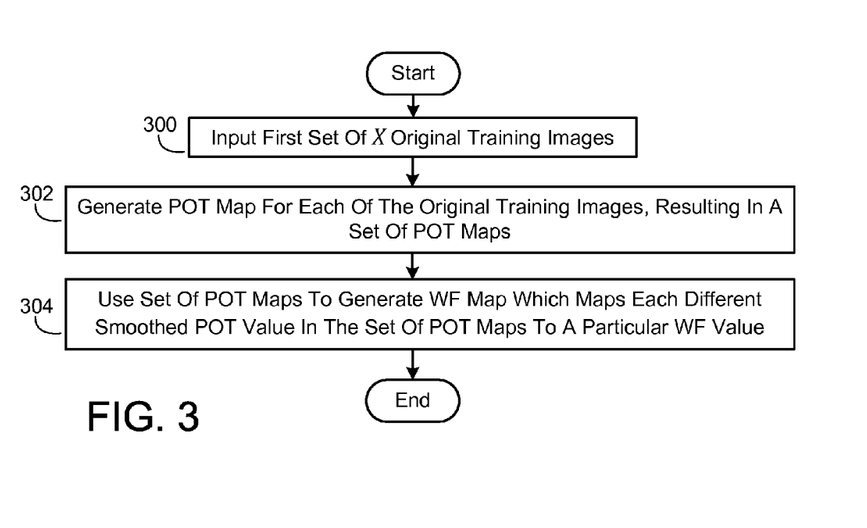
FIG. 3 is a flow diagram illustrating an exemplary embodiment, in simplified form, of a process for generating a weighting factor (WF) map which maps each different smoothed POT value to a particular WF value.

FIG. 3 illustrates an exemplary embodiment, in simplified form, of a process for generating the WF map which maps each different smoothed POT value to a particular WF value. As exemplified in FIG. 3, the process starts in element 300 by inputting a first set of original training images. In one implementation the training images are made up of a variety of compound images, where these compound images are derived from a variety of sources and have a variety of pixel resolutions, and where X denotes the total number of original training images in this first set. In an exemplary embodiment of the image resizing technique described herein the set of original training images is made up of several hundred compound images which are derived from a variety of sources, such as images of various web pages, images of various presentation slides, various screen capture images, and the like.

Referring again to FIGS. 2 and 3, a POT map is then generated for each of the original training images in the first set using the aforementioned process for generating the POT map for the original image which is exemplified in FIGS. 2A and 2B, resulting in a set of POT maps (element 302). However, in this generation of a POT map for each of the original training images, process element 232 is skipped, and process element 234 applies the aforementioned Gauss kernel to each POT value in the preliminary POT map. The POT map for each original training image specifies a smoothed POT value for each pixel in the image, where $pt^i$ denotes the smoothed POT value for the i-th pixel in the image. The set of POT maps is then used to generate the WF map which maps each different smoothed POT value in the set of POT maps to a particular WF value (element 304). The manner in which this WF map generation is performed will now be described in more detail.

In general, given that $w(pt_g)$ denotes the WF value for the smoothed POT value $pt_g$ which is associated with a given pixel group g, the WF map is generated using the following equation:

$$w(pt_g) = \underset{w(pt_g)}{\operatorname{argmin}}\left\{\sum_{x=1}^{X}\sum_{n=1}^{T}(y_{Ax}^n - y_{Origx}^n)^2\right\}, \quad (3)$$

where x denotes a current twice-resized training image indicator, T denotes the total number of pixels in the current twice-resized training image that have the smoothed POT value $pt_g$, $y_{Ax}^n$ denotes an adjusted luminance value for a given n-th pixel in a given x-th twice-resized training image that has the smoothed POT value $pt_g$ where $1 \le n \le T$, and $y_{Origx}^n$ denotes the original luminance value for an n-th pixel in the x-th original training image in the first set that corresponds to $y_{Ax}^n$.

Figure 4A:
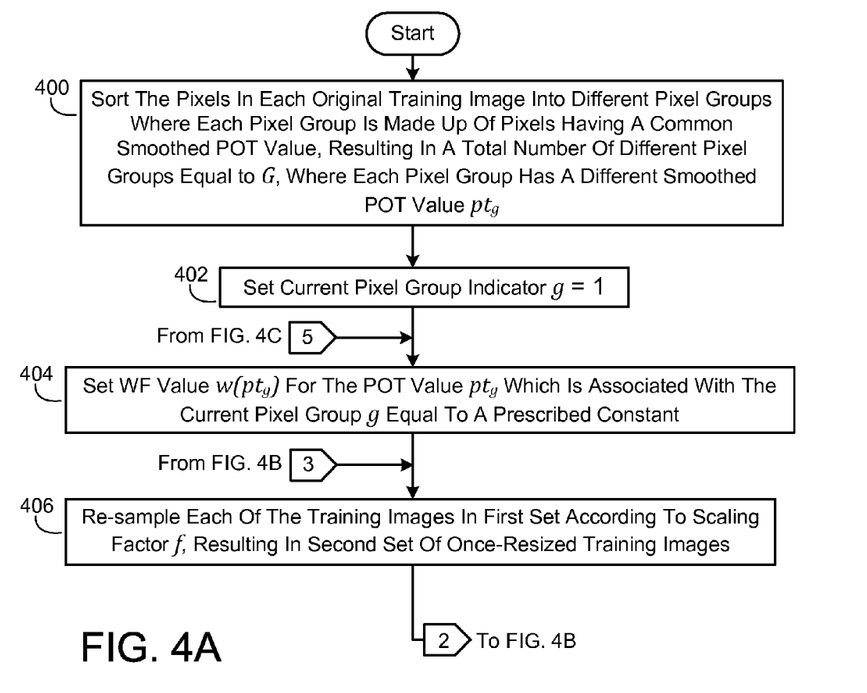
FIGS. 4A-4C are a flow diagram illustrating an exemplary implementation of a process for calculating the WF value for the smoothed POT value associated with a particular group of pixels.
Figure 4B:
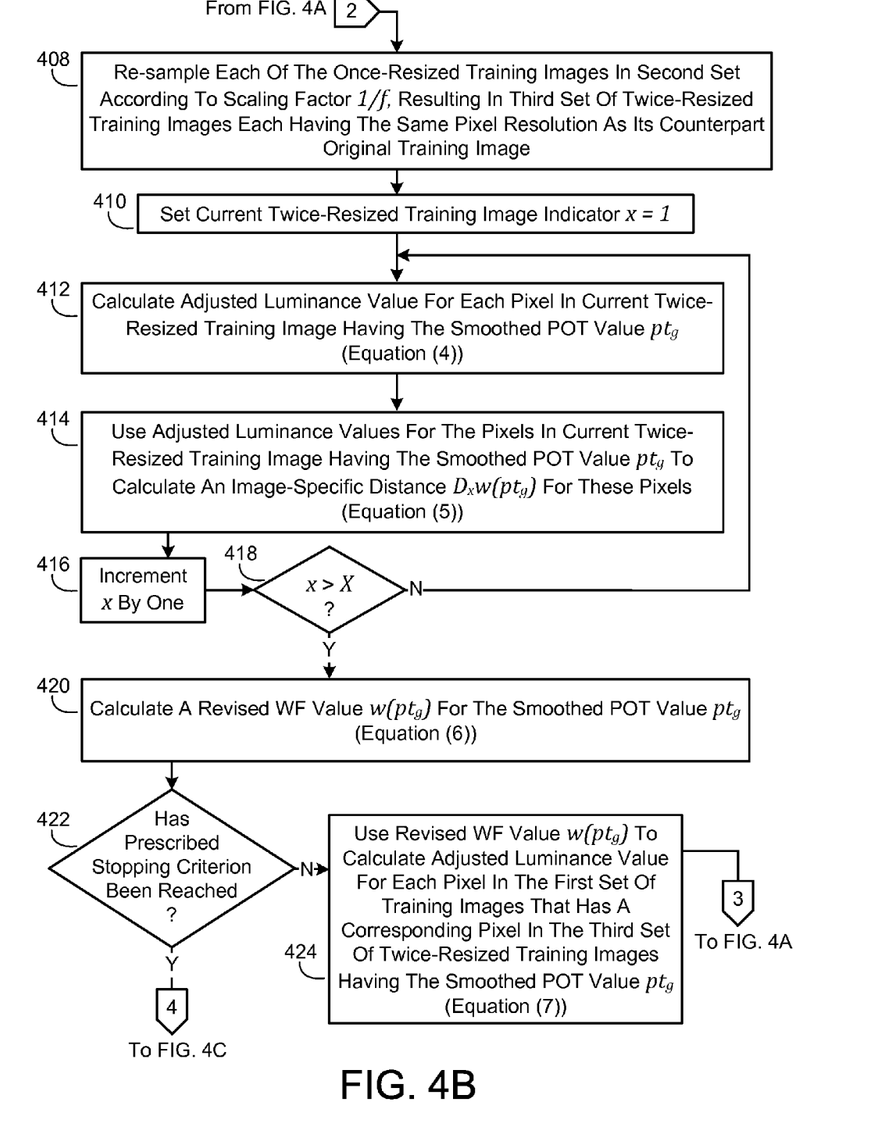
Figure 4C:
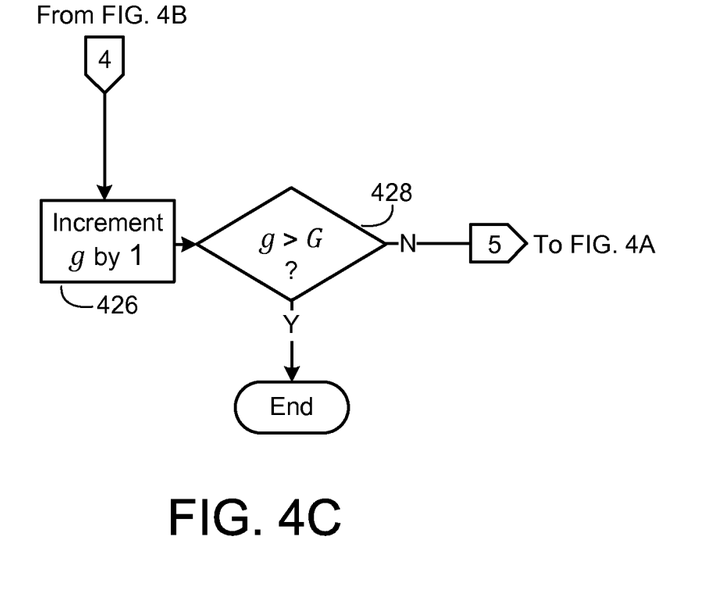

FIGS. 4A-4C illustrate an exemplary implementation of a process for using the set of POT maps to generate the WF map which maps each different smoothed POT value in the set of POT maps to a particular WF value. As exemplified in FIGS. 4A and 4B, the process starts in element 400 by sorting the pixels in each original training image into different pixel groups where each pixel group is made up of pixels having a common smoothed POT value, resulting in a total number of different pixel groups equal to G, where each pixel group has a different smoothed POT value, g denotes a current pixel group indicator (i.e., $1 \le g \le G$), and $pt_g$ denotes the smoothed POT value which is associated with a given pixel group g. The value of the current pixel group indicator g is then initialized to one (element 402). The value of $w(pt_g)$ is then initialized to a prescribed constant (element 404). In one embodiment of the image resizing technique described herein this prescribed constant has a value of zero. Other embodiments of the image resizing technique are also possible where this prescribed constant can have other values which are greater than zero and less than or equal to one. Each of the training images in the first set is then re-sampled according to the aforementioned prescribed image scaling factor f, resulting in a second set of once-resized training images, where the total number of once-resized training images in the second set is X (element 406). Each of the once-resized training images in the second set is then re-sampled according to a scaling factor 1/f resulting in a third set of twice-resized training images, where the total number of twice-resized training images in the third set is X and each twice-resized training image has the same pixel resolution (i.e., the same size) as its counterpart original training image (element 408). It is noted that the re-sampling in elements 406 and 408 is performed using the same method that is employed to re-sample the original image as described heretofore. The value of x is then initialized to one (element 410).

Referring again to FIG. 4B, an image-specific distance is then calculated for the pixels in the current twice-resized training image having the smoothed POT value $pt_g$ in the following manner. An adjusted luminance value for each pixel in the current twice-resized training image having the smoothed POT value $pt_g$ is calculated first (element 412). Given that $y_O^n$ denotes the original luminance value for a given n-th pixel in the current twice-resized training image that has the smoothed POT value $pt_g$, and $y_A^n$ denotes an adjusted luminance value for this n-th pixel, $y_A^n$ can be given by the following equation:

$$y_A^n = y_O^n + w(pt_g) \times \Delta y_O^n, \quad (4)$$

where $\Delta$ denotes the aforementioned Laplace operator. Given that $y_{Orig}^n$ denotes the original luminance value for a given n-th pixel in the first set of original training images that corresponds to $y_O^n$, the adjusted luminance values for the pixels in the current twice-resized training image having the smoothed POT value $pt_g$ are then used to calculate an image-specific distance $D_x(w(pt_g))$ for these pixels using the following equation (element 414):

$$D_x(w(pt_g)) = \sum_{n=1}^{T}(y_A^n - y_{Orig}^n)^2. \quad (5)$$

Referring again to FIG. 4B, the current twice-resized training image indicator x is then incremented by one (element 416). In the case where x is not greater than the total number of twice-resized training images X (element 418), process elements 412, 414 and 416 are repeated in order to calculate an image-specific distance $D_x(w(pt_g))$ for the pixels in the next twice-resized training image having the smoothed POT value $pt_g$. Once an image-specific distance $D_x(w(pt_g))$ has been calculated for the pixels in all of the twice-resized training images having the smoothed POT value $pt_g$ (i.e., once x is greater than X) (element 418), a revised WF value $w(pt_g)$ for the smoothed POT value $pt_g$ can be calculated using the following equation (element 420):

$$w(pt_g) = \sum_{x=1}^{X} D_x(w(pt_g)). \quad (6)$$

A determination is then made as to whether or not a prescribed stopping criterion has been reached (element 422). This prescribed stopping criterion will be described in more detail hereafter.

Referring again to FIGS. 4A and 4B, in the case where the prescribed stopping criterion has not been reached (element 422), the revised WF value $w(pt_g)$ is then used to calculate an adjusted luminance value for each pixel in the first set of training images that has a corresponding pixel in the third set of twice-resized training images having the smoothed POT value $pt_g$ (element 424), where this calculation takes place as follows. Given that $y_{OO}{}^n$ denotes the luminance value for a given n-th pixel in the first set of training images that has a corresponding pixel in the third set of twice-resized training images having the smoothed POT value $pt_g$, and $y_{AA}{}^n$ denotes an adjusted luminance value for this n-th pixel, $y_{AA}{}^n$ can be given by the following equation:

$$y_{AA}{}^n = y_{OO}{}^n + w(pt_g) \times \Delta y_{OO}{}^n, \quad (7)$$

where $\Delta$ denotes the aforementioned Laplace operator. Process elements 406-424 are then iteratively repeated until the prescribed stopping criterion has been reached (element 422).

Generally speaking, the iterative repetition of process elements 406-424 serves to find the WF value $w(pt_g)$ that minimizes $\Sigma_{x=1}^{X} \Sigma_{n=1}^{T} (y_{Ax}{}^n - y_{Origx}{}^n)^2$ for the pixels in the training images having the smoothed POT value $pt_g$. More particularly, and referring again to FIGS. 4A and 4B, in one embodiment of the image resizing technique described herein the prescribed stopping criterion is that the difference between the revised WF value $w(pt_g)$ calculated in the most recent iteration of process elements 406-424 and the WF value $w(pt_g)$ calculated in the immediately prior iteration of process elements 406-424 is less than a prescribed stopping threshold. In another embodiment of the image resizing technique this prescribed stopping criterion is that a prescribed number of iterations of process elements 406-424 have been completed. In yet another embodiment of the image resizing technique this prescribed stopping criterion is that either the difference between the revised WF value $w(pt_g)$ calculated in the most recent iteration of process elements 406-424 and the WF value $w(pt_g)$ calculated in the immediately prior iteration of process elements 406-424 is less than a prescribed stopping threshold, or a prescribed number of iterations of process elements 406-424 have been completed, whichever occurs first.

As exemplified in FIG. 4C, and referring again to FIGS. 4A and 4B, once the prescribed stopping criterion has been reached (element 422), the current pixel group indicator g is then incremented by one (element 426). In the case where g is not greater than the total number of pixel groups G (element 428), process elements 404-426 are repeated in order to calculate the WF value $w(pt_g)$ for the smoothed POT value $pt_g$ associated with the next pixel group g. In the case where g is greater than G (element 428), WF values have been calculated for all of the pixel groups and thus, the WF map has been completely generated.

It is noted that the WF map that is generated by the procedure that has just been described corresponds to a particular image scaling factor f. It is further noted that the WF map generation procedure can be implemented in an offline manner in order to pre-generate the WF map. As such, different values for f can be used to independently pre-generate different WF maps in an offline manner, where each different WF map that is pre-generated corresponds to a different value for f, and f can be sequentially varied within a prescribed range of scaling factors using a prescribed increment. In one embodiment of the image resizing technique described herein the prescribed range of scaling factors is $0.4 \leq f \leq 2.5$ and the prescribed increment is 0.1.

In the situation where an original image is being resized according to a desired scaling factor and a WF map has not yet been generated for the desired scaling factor, the scaling factor for which a WF map has been pre-generated that is nearest to the desired scaling factor can be determined, and the WF map corresponding to this nearest scaling factor can be used in the aforementioned procedure to calculate an adjusted luminance value for each pixel in the initial resized image as given by equation (1). In this manner, the image resizing technique embodiments described herein can support arbitrary scaling factors which can be either integer-based or non-integer-based, and which can be either less than one (resulting in an image size reduction) or greater than one (resulting in an image size enlargement).

2.0 Graphics Processing Unit (GPU) Acceleration

Figure 5:
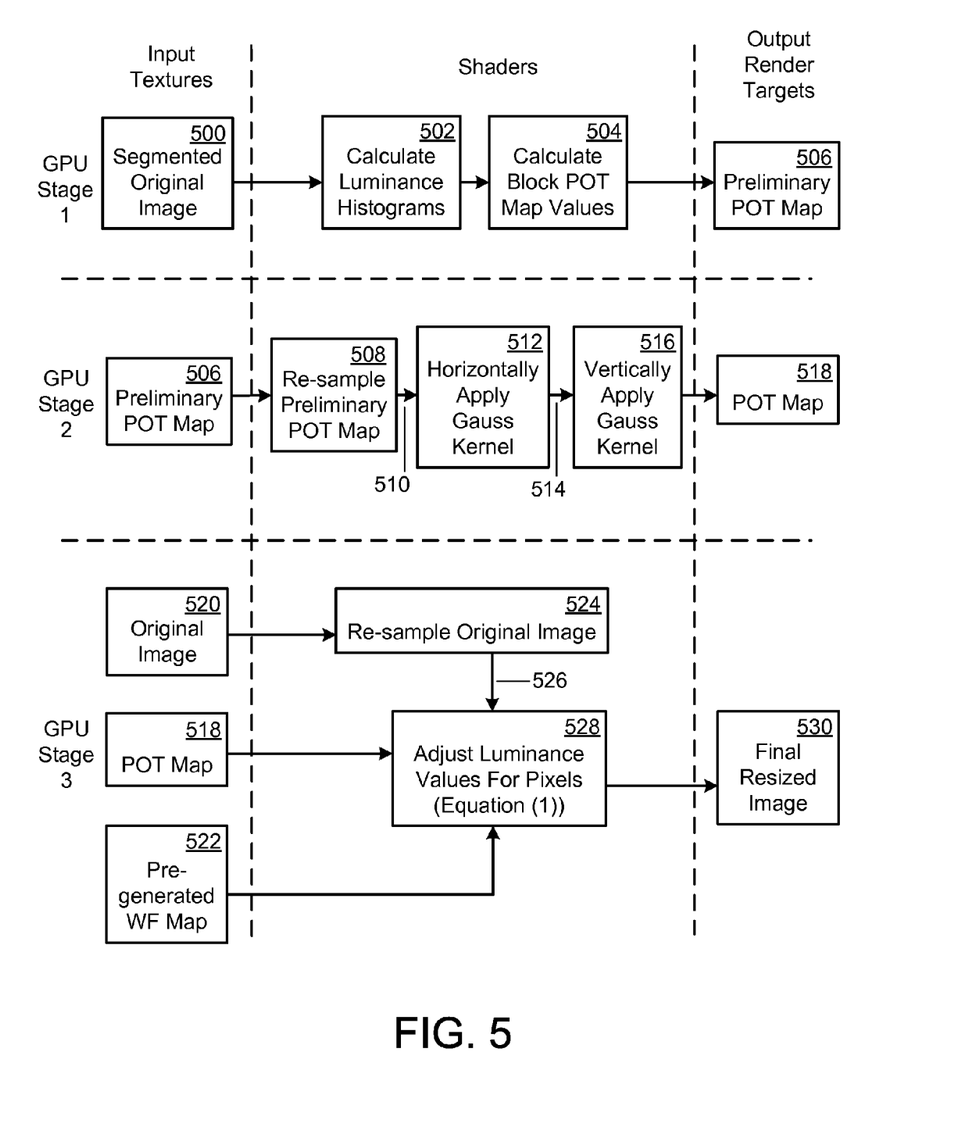
FIG. 5 is a diagram illustrating an exemplary embodiment, in simplified form, of a framework for accelerating the performance of the image resizing technique embodiments using commercially available graphics processing unit (GPU) hardware.

FIG. 5 illustrates an exemplary embodiment, in simplified form, of a framework for accelerating the performance of the image resizing technique embodiments described herein using commercially available GPU hardware. In one embodiment of the image resizing technique this GPU acceleration framework is implemented on a GeForce® 7950 GTX graphics card manufactured by NVIDIA® Corporation, Santa Clara, Calif. It is noted however that the image resizing technique embodiments can also be implemented on other types of GPU hardware.

Generally speaking and as exemplified in FIG. 5, the framework for accelerating the performance of the image resizing technique embodiments described herein includes three different GPU processing stages each of which includes a plurality different GPU passes, where the processing and related calculations associated with each pass of each stage can be implemented in the form of custom shader program modules which are executed on the GPU in a parallel/concurrent manner. More particularly, once the original image has been segmented into equal-sized blocks of pixels where each block has a size of z pixels×z pixels as described heretofore, the preliminary POT map 506 can be generated from the segmented original image 500 in a first GPU processing stage as follows. In one GPU pass the luminance histogram for the pixels in each block can be calculated in a parallel/concurrent manner (element 502) as also described heretofore. Each histogram can then be rendered to a 32-bit RGBA texture having the same pixel resolution as the original image (not shown). In another GPU pass a block POT map value for the pixels in each block can then be calculated in a parallel/concurrent manner (element 504) as also described heretofore. After the first GPU processing stage has been completed, the preliminary POT map can then be rendered to a z × z re-sampled texture map (not shown).

Referring again to FIG. 5, the POT map 518 can then be generated from the preliminary POT map 506 in a second GPU processing stage as follows. In yet another GPU pass the preliminary POT map can be re-sampled according to the prescribed scaling factor (element 508) as described heretofore, resulting in the resized POT map 510 that matches the pixel resolution of the initial resized image 526. In yet another GPU pass the aforementioned Gauss kernel can then be horizontally applied to each POT value in the resized POT map in a parallel/concurrent manner (element 512), resulting in a horizontally smoothed POT map 514. In yet another GPU pass the Gauss kernel can then be vertically applied to each POT value in the horizontally smoothed POT map in a parallel/concurrent manner (element 516).

Referring again to FIG. 5, the final resized image 530 can then be generated from the original image 520 in a third GPU processing stage as follows. In yet another GPU pass the original image can be re-sampled according to the prescribed scaling factor, resulting in the initial resized image 526 (element 524) as described heretofore. In yet another GPU pass the WF map which corresponds to the prescribed scaling factor 522 (which has been pre-generated as also described heretofore) can then be used to calculate an adjusted luminance value for each pixel in the initial resized image in a parallel/concurrent manner (element 528) as also described heretofore. It is noted that the aforementioned different WF maps which have been independently pre-generated for different scaling factor values can be stored in a two-dimensional texture map (not shown), thus making the adjusted luminance value calculation for each pixel a simple texture fetching operation in the GPU.

It will be appreciated that for video the image resizing technique embodiments will resize each frame of the video independently. However, in typical personal computing applications such as remote desktop there will usually be one or more large regions of consecutive frames which share identical luminance values and thus will share the same POT values. This fact can be taken into consideration in order to further accelerate the performance of the image resizing technique embodiments.

3.0 Additional Embodiments

While the image resizing technique has been described in more detail by specific reference to embodiments thereof, it is understood that variations and modifications thereof can be made without departing from the true spirit and scope of the image resizing technique. It is also noted that any or all of the aforementioned embodiments can be used in any combination desired to form additional hybrid embodiments. Although the image resizing technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the image resizing technique embodiments described herein can be implemented. These image resizing technique embodiments are operational with numerous general purpose or special purpose computing system environments or configurations. Exemplary well known computing systems, environments, and/or configurations that can be suitable include, but are not limited to, PCs, server computers, handheld devices such as cell phones, PDAs, and the like, laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
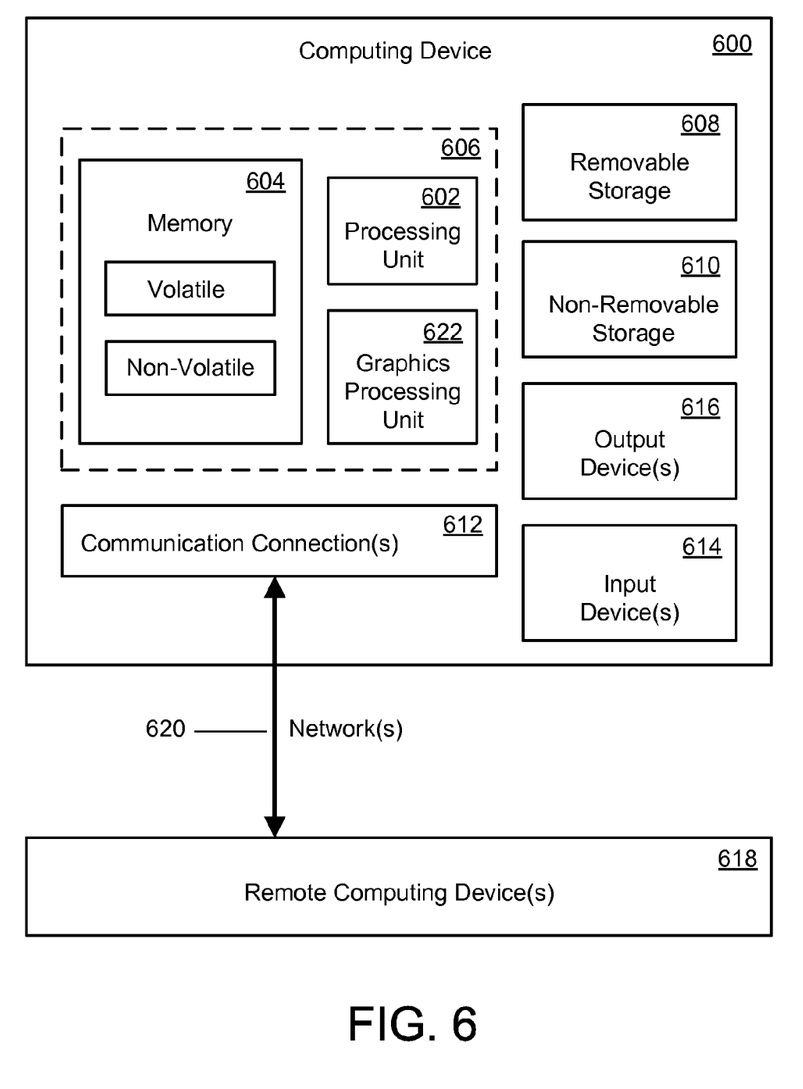
FIG. 6 is a diagram illustrating an exemplary embodiment, in simplified form, of a network-based computing device which constitutes an exemplary system for implementing portions of the image resizing technique embodiments described herein.

FIG. 6 illustrates an exemplary embodiment, in simplified form, of a suitable computing system environment according to the image resizing technique embodiments described herein. The environment illustrated in FIG. 6 is only one example of a suitable computing system environment and is not intended to suggest any limitation as to the scope of use or functionality of the image resizing technique embodiments described herein. Neither should the computing system environment be interpreted as having any dependency or requirement relating to any one or combination of components exemplified in FIG. 6.

As exemplified in FIG. 6, an exemplary system for implementing portions of the image resizing technique embodiments described herein includes one or more computing devices, such as computing device 600. In its simplest configuration, computing device 600 typically includes at least one processing unit 602, at least one GPU 622 and memory 604. The GPU 622 has a parallel processing architecture for accelerating image resizing and performing other graphics-related functions. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disk (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 can also include one or more communications connections 612 that allow the device to operate in a networked environment and communicate with one or more remote computing devices 618. Each remote computing device 618 can be a cell phone, a PDA, a PC, a server, a router, a peer device, or other common network node, and typically includes many or all of the elements described herein relative to computing device 600. Communication between computing devices takes place over one or more networks 620, each of which provides a logical connection between the computing devices. Each logical connection can include one or more different types of networks including, but not limited to, local area networks (LANs) and wide area networks (WANs). Such networking environments are commonplace in conventional offices, enterprise-wide computer networks, intranets and the Internet. It will be appreciated that the communications connections 612 and related networks 620 described herein are exemplary and other means of establishing communication between the computing devices can be used.

As exemplified in FIG. 6, communications connections 612 and related networks 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared and other wireless media. The term "computer-readable medium" as used herein includes both the aforementioned storage media and communication media.

As exemplified in FIG. 6, computing device 600 can also include one or more input devices 614 and one or more output devices 616. Exemplary input devices 614 include, but are not limited to, a keyboard, mouse, pen, touch input device, microphone, and camera, among others. A user can enter commands and various types of information into the computing device 600 through the input devices 614. Exemplary output devices 616 include, but are not limited to, one or more display devices, a printer, and audio output devices, among others. These input and output devices are well known and need not be described at length here.

Referring again to FIG. 6, the image resizing technique embodiments described herein can be further described and/or implemented in the general context of computer-executable instructions, such as program modules, which are executed by computing device 600. Generally speaking, program modules include routines, programs, objects, components, and data structures, among other things, that perform particular tasks or implement particular abstract data types. The image resizing technique embodiments can also be practiced in a distributed computing environment where tasks are performed by one or more remote computing devices 618 that are linked through one or more communications networks 612/620. In the distributed computing environment, program modules can be located in both local and remote computer storage media including, but not limited to, memory 604 and storage devices 608/610.

Wherefore, what is claimed is:

1. A computer-implemented process for resizing a digital image, comprising:
using a computer to perform the following process actions:
inputting an original image which is to be resized according to a prescribed image scaling factor f, wherein the original image comprises an array of pixels having a particular pixel resolution, and each pixel comprises a luminance value;
re-sampling the original image according to f, resulting in an initial resized image;
generating a probability of text (POT) map for the initial resized image, wherein the POT map specifies a POT value for each pixel in the initial resized image, each of said POT values estimating the probability of the associated pixel being either a text pixel or a graphics pixel, and each of said POT values being determined using a luminance value histogramming procedure;
generating a weighting factor (WF) map which maps each different smoothed POT value to a particular WF value, said generating comprising,
inputting a first set of original training images, wherein each original training image comprises an array of pixels and each pixel comprises an original luminance value,
generating a POT map for each of the original training images in the first set, resulting in a set of POT maps, wherein the POT map for each original training image specifies a smoothed POT value for each pixel in said image, and
using the set of POT maps to generate the WF map, said using comprising,
(a) sorting the pixels in each original training image into different pixel groups wherein each pixel group (g) is made up of pixels having a common smoothed POT value, each pixel group (g) has a different smoothed POT value $pt_g$, and
(b) for each pixel group (g),
(i) initially setting a WF value $w(pt_g)$ for the smoothed POT value $pt_g$ equal to a prescribed constant,
(ii) re-sampling each of the training images in the first set according to the prescribed image scaling factor f, resulting in a second set of once-resized training images,
(iii) re-sampling each of the once-resized training images in the second set according to a scaling factor 1/f, resulting in a third set of twice-resized training images, wherein each twice-resized training image has the same pixel resolution as its counterpart original training image,
(iv) for each twice-resized training image in the third set,
calculating an adjusted luminance value for each pixel in said image having the smoothed POT value $pt_g$, and
using the adjusted luminance values for said pixels having the smoothed POT value $pt_g$ to calculate an image-specific distance $D_x(w(pt_g))$ for said pixels, wherein x is a twice-resized training image indicator,
(v) calculating a revised WF value $w(pt_g)$ for the smoothed POT value $pt_g$ using the equation $w(pt_g)=\Sigma_{x=1}^{X}D_x(w(pt_g))$, wherein X is the total number of twice-resized training images in the third set, and
(vi) whenever a prescribed stopping criterion has not been reached,
using the revised WF value $w(pt_g)$ to calculate an adjusted luminance value for each pixel in the first set of training images that has a corresponding pixel in the third set of twice-resized training images having the smoothed POT value $pt_g$, and
repeating process actions (ii)-(vi); and
using the WF map to calculate an adjusted luminance value for each pixel in the initial resized image, resulting in a final resized image.

2. The process of claim 1, wherein the prescribed constant equals zero.

3. The process of claim 1, wherein the adjusted luminance value for an n-th pixel in a given twice-resized training image having the smoothed POT value $pt_g$ is given by the equation $y_A{}^n=y_O{}^n+w(pt_g)\times\Delta y_O{}^n$, wherein $y_O{}^n$ is the original luminance value for said n-th pixel and $\Delta$ is a Laplace operator.

4. The process of claim 3, wherein the image-specific distance for the pixels in an x-th twice-resized training image having the smoothed POT value $pt_g$ is given by the equation $D_x(w(pt_g))=\Sigma_{n=1}^{T}(y_A{}^n-y_{Orig}{}^n)^2$, wherein T is the total number of pixels in said image having the smoothed POT value $pt_g$ and $y_{Orig}{}^n$ is the original luminance value for a given n-th pixel in the first set of original training images that corresponds to $y_O{}^n$.

5. The process of claim 1, wherein the adjusted luminance value for an n-th pixel in the first set of training images that has a corresponding pixel in the third set of twice-resized training images having the smoothed POT value $pt_g$ is given by the equation $y_{AA}''=y_{OO}''+w(pt_g)\times\Delta y_{OO}''$, wherein $y_{OO}''$ is the original luminance value for said n-th pixel and $\Delta$ is a Laplace operator.

6. The process of claim 1, wherein the prescribed stopping criterion comprises the difference between the revised WF value $w(pt_g)$ that is calculated in a most recent iteration of process actions (ii)-(vi) and the WF value $w(pt_g)$ that was calculated in an immediately prior iteration of process actions (ii)-(vi) being less than a prescribed stopping threshold.

7. The process of claim 1, wherein the prescribed stopping criterion comprises a prescribed number of iterations of process actions (ii)-(vi) being completed.

8. The process of claim 1, wherein,
the first set of original training images comprises a variety of compound images which are derived from a variety of sources and which have a variety of pixel resolutions, and
each compound image comprises,
regions comprising either text content, or graphics content, or both text and graphics content, and
regions comprising natural image content.

9. The process of claim 1, wherein the original image is a compound image comprising:
regions comprising either text content, or graphics content, or both text and graphics content; and
regions comprising natural image content.

10. A computer-implemented process for resizing a digital image, comprising:
using a computer to perform the following process actions:
inputting an original image which is to be resized according to a prescribed image scaling factor f, wherein the original image comprises an array of pixels having a particular pixel resolution, and each pixel comprises a luminance value;
re-sampling the original image according to f, resulting in an initial resized image;
generating a probability of text (POT) map for the initial resized image, wherein the POT map specifies a POT value for each pixel in the initial resized image, each of said POT values estimating the probability of the associated pixel being either a text pixel or a graphics pixel, and each of said POT values being determined using a luminance value histogramming procedure;
generating a weighting factor (WF) map which maps each different smoothed POT value to a particular WF value; and
using the WF map to calculate an adjusted luminance value for each pixel in the initial resized image, resulting in a final resized image, wherein the adjusted luminance value for the i-th pixel in the final resized image is given by the equation $y_{FR}^i=y_{IR}^i+w(pt^i)\times\Delta y_{IR}^i$, wherein $y_{IR}^i$ is the luminance value for the i-th pixel in the initial resized image, $pt^i$ is the smoothed POT value for the i-th pixel in the initial resized image, $w(pt^i)$ is the WF value for $pt^i$, and $\Delta$ is a Laplace operator.

11. The process of claim 10, wherein a kernel given by $$\begin{pmatrix} -1 & -1 & -1 \\ -1 & 8 & -1 \\ -1 & -1 & -1 \end{pmatrix}$$

is employed for $\Delta y_{IR}^i$.

12. A computer-implemented process for resizing a digital image, comprising:
using a computer to perform the following process actions:
inputting an original image which is to be resized according to a prescribed image scaling factor f, wherein the original image is a compound image comprising an array of pixels having a particular pixel resolution, and each pixel comprises a luminance value;
re-sampling the original image according to f, resulting in an initial resized image, wherein said re-sampling is performed using bilinear interpolation;
generating a preliminary probability of text (POT) map for the original image;
re-sampling the preliminary POT map according to the prescribed image scaling factor f, resulting in a resized POT map that matches the pixel resolution of the initial resized image, wherein the resized POT map specifies a POT value for each pixel in the initial resized image;
applying a Gauss kernel to each POT value in the resized POT map, resulting in a POT map for the initial resized image, wherein the POT map specifies a smoothed POT value for each pixel in the initial resized image;
generating a weighting factor (WF) map which maps each different smoothed POT value to a particular WF value, said generation comprising the actions of,
(a) inputting a first set of original training images comprising a variety of compound images which are derived from a variety of sources and which have a variety of pixel resolutions, wherein each original training image comprises an array of pixels and each pixel comprises an original luminance value,
(b) generating a POT map for each of the original training images in the first set, resulting in a set of POT maps, wherein the POT map for each original training image specifies a smoothed POT value for each pixel in said image,
(c) sorting the pixels in each original training image into different pixel groups wherein each pixel group (g) is made up of pixels having a common smoothed POT value, each pixel group (g) has a different smoothed POT value, and $pt_g$ is the smoothed POT value which is associated with a given pixel group (g), and
(d) for each pixel group (g),
(i) initially setting a WF value $w(pt_g)$ for the smoothed POT value $pt_g$ equal to a prescribed constant,
(ii) re-sampling each of the training images in the first set according to the prescribed image scaling factor f, resulting in a second set of once-resized training images,
(iii) re-sampling each of the once-resized training images in the second set according to a scaling factor 1/f, resulting in a third set of twice-resized training images, wherein each twice-resized training image has the same pixel resolution as its counterpart original training image,
(iv) for each twice-resized training image in the third set,
calculating an adjusted luminance value for each pixel in said image having the smoothed POT value $pt_g$, and
using the adjusted luminance values for said pixels having the smoothed POT value $pt_g$ to calculate an image-specific distance for said pixels,
(v) using the image-specific distances for the twice-resized training images to calculate a revised WF value $w(pt_g)$ for the smoothed POT value $pt_g$, and (vi) whenever a prescribed stopping criterion has not been reached,
   using the revised WF value $w(pt_g)$ to calculate an adjusted luminance value for each pixel in the first set of training images that has a corresponding pixel in the third set of twice-resized training images having the smoothed POT value $pt_g$, and repeating process actions (ii)-(vi); and using the WF map to calculate an adjusted luminance value for each pixel in the initial resized image, resulting in a final resized image, wherein the adjusted luminance value for the i-th pixel in the final resized image is given by the equation $y_{FR}^i = y_{IR}^i + w(pt^i) \times \Delta y_{IR}^i$, wherein $y_{IR}^i$ is the luminance value for the i-th pixel in the initial resized image, $pt^i$ is the smoothed POT value for the i-th pixel in the initial resized image, $w(pt^i)$ is the WF value for $pt^i$, and $\Delta$ is a Laplace operator.

\* \* \* \* \*